(12) United States Patent
Lefkowitz

(10) Patent No.: US 6,249,310 B1
(45) Date of Patent: *Jun. 19, 2001

(54) DISCRETE SURVEILLANCE CAMERA DEVICES

(75) Inventor: Stephen Lefkowitz, Englewood Cliffs, NJ (US)

(73) Assignee: SLC Technologies Inc., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,104

(22) Filed: Mar. 1, 2000

Related U.S. Application Data

(63) Continuation of application No. 08/570,115, filed on Dec. 11, 1995, now Pat. No. 6,064,430.

(51) Int. Cl.[7] ................. H04N 7/12; H04N 9/47
(52) U.S. Cl. ................. 348/151; 348/143; 348/153
(58) Field of Search ................. 348/143, 151, 348/152, 153, 159, 211, 373; 358/87; H04N 7/18, 9/47

(56) References Cited

U.S. PATENT DOCUMENTS

| | | | |
|---|---|---|---|
| D. 340,202 | 10/1993 | Fenne et al. .................. | D10/106 |
| D. 341,135 | 11/1993 | Sedighzadeh et al. .......... | D14/127 |
| D. 382,217 | 8/1997 | Akiyama et al. ............... | D10/106 |
| D. 386,101 | 11/1997 | Kawabata ...................... | D10/106 |
| D. 399,157 | 10/1998 | Hsu et al. ..................... | D10/106 |
| 3,535,442 | 10/1970 | Jennings ....................... | 178/6.8 |
| 3,732,368 | 5/1973 | Mahlab ......................... | 348/151 |
| 3,935,380 | 1/1976 | Coutta .......................... | 348/151 |
| 4,080,629 | 3/1978 | Hammond et al. ............. | 348/151 |
| 4,160,999 | 7/1979 | Claggett ....................... | 348/151 |
| 4,217,606 | 8/1980 | Nordmann ..................... | 348/373 |
| 4,337,482 | 6/1982 | Coutta .......................... | 348/159 |
| 4,772,942 | 9/1988 | Tuck ............................. | 358/87 |
| 4,918,473 | 4/1990 | Blackshear .................... | 348/143 |
| 4,963,962 | 10/1990 | Kruegle et al. ................ | 348/151 |
| 4,982,281 | 1/1991 | Gutierrez ...................... | 348/151 |
| 5,023,725 | * 6/1991 | McCutchen ................... | 348/38 |
| 5,130,794 | 7/1992 | Ritchey ........................ | 358/87 |
| 5,155,474 | 10/1992 | Park et al. ..................... | 340/691 |
| 5,293,243 | 3/1994 | Degnan ......................... | 348/369 |
| 5,440,337 | * 8/1995 | Henderson et al. ............ | 348/144 |
| 5,568,189 | 10/1996 | Kneller ......................... | 348/373 |

FOREIGN PATENT DOCUMENTS

2693868 * 1/1994 (FR) ................................ 7/18

* cited by examiner

Primary Examiner—Howard Britton
Assistant Examiner—Nhon T Diep
(74) Attorney, Agent, or Firm—Lerner, David, Littenberg, Krumholz & Mentlik, LLP

(57) ABSTRACT

A discrete surveillance device for observing a surveillance location has a housing formed in the shape of a smoke detector and multiple miniature video surveillance cameras mounted within the housing to simultaneously observe multiple areas of the surveillance location. The surveillance cameras are concealed in the housing from an observer viewing the exterior of the housing. Further discrete surveillance devices include a face plate or housing having a clock exterior with a miniature video surveillance camera mounted on an adjustable camera gimbal attached to the back surface of the face plate or clock. The surveillance camera is concealed from an observer viewing the exterior surface of the face plate or clock.

5 Claims, 2 Drawing Sheets

DISCRETE SURVEILLANCE CAMERA DEVICES

CROSS REFERENCE TO RELATED APPLICATIONS

This application is a continuation of U.S. application Ser. No. 08/570,115 filed on Dec. 11, 1995 now U.S. Pat. No. 6,064,430.

FIELD OF THE INVENTION

The present invention relates to discrete or covert surveillance devices, and more particularly to such discrete devices that include one or more miniature video surveillance cameras hidden in objects resembling household, commercial or office devices such as smoke detectors, in-wall mounted face plates and desktop or wall clocks.

BACKGROUND OF THE INVENTION

With the advent of miniature video cameras, such as CCD (charged couple device) cameras, surveillance products incorporating such miniature cameras have dramatically proliferated. CCD cameras can now be hidden in numerous locations such as in pocketbooks, behind walls, in ceilings and within ordinary objects. Although to some the thought of hidden video cameras placed in unsuspected locations raises invasion of privacy issues and notions of George Orwell's "Big Brother," many industries today must use hidden cameras as an additional security measure in order to protect their inventory, premises and customers. For instance, financial institutions such as banks use hidden surveillance cameras to offer additional protection to their customers and to help guard against theft. Hidden video cameras are also being used more frequently in the home for the protection of children and personal property.

While it is oftentimes desirable to mount surveillance or closed circuit cameras in visible locations to create an awareness that an area is being observed, it is also desirable in many situations to use hidden or discrete surveillance cameras. Such discrete surveillance cameras can be located almost anywhere in a room, such as in a speaker, in an exit sign, in the ceiling, etc. For example, in one type of prior art discrete surveillance product offered by CCTV Corp. of South Hackensack, N.J. (model no. SD-100), a single CCD video camera is mounted in a housing resembling a household smoke detector. This surveillance product uses a single CCD camera and provides only one viewing area through a small hole in the bottom wall of the smoke detector. Because the smoke detector is normally located on the ceiling of a room, this surveillance device provides only a downward view of the room below and displays only the top of a person's head passing under the detector. This viewing angle can make it difficult to identify individuals passing below the surveillance camera. Moreover, since the camera is mounted in a fixed position in the detector housing, the positioning of the camera, such as setting the desired downward camera projection angle, cannot be adjusted without adjusting the position of the entire detector. Mounting the smoke detector at an angle, however, looks out of the ordinary to a casual observer and may tip him or her off that the device actually contains a surveillance camera.

As with the above-mentioned discrete smoke detector surveillance product, other "discrete" surveillance devices lack the ability of adjustable camera positioning. For example, while prior art "overt" surveillance devices have been available with an adjustable camera gimbal, such as model no. CM-200 from CCTV Corp., which provides a CCD camera completely visible to the observer behind a clear wall face plate and mounted on an adjustable camera gimbal, this type of camera adjustability is lacking in discrete-type surveillance devices.

SUMMARY OF THE INVENTION

One aspect of the present invention provides a discrete surveillance device for observing a surveillance location including a housing having an interior, an exterior formed in the shape of a smoke detector and two or more camera viewing apertures formed in the exterior of said housing. One or more miniature video surveillance cameras are mounted within the interior of the housing on a camera gimbal provided for each of the surveillance cameras, and each camera gimbal includes at least two perpendicular axes of rotation to allow horizontal and vertical swivel positioning and adjustment of a respective surveillance camera. The surveillance cameras are arranged such that they are directed out of the camera viewing apertures to allow observation of multiple areas of the surveillance location by the cameras. Concealing means are provided for concealing the surveillance cameras from an observer viewing the exterior of the housing.

The housing of the discrete surveillance device desirably includes gimbal mounting posts attached to the interior of the housing and the camera gimbal further includes a mounting bracket for adjustably mounting the gimbal to gimbal mounting posts. The mounting bracket preferably includes a generally T-shaped body portion having a first leg portion including a camera mounting aperture and a second leg portion generally transverse to the first leg portion including one or more post mounting apertures for attaching the mounting bracket to one or more mounting posts, and stabilizing means for stabilizing the mounting bracket against the interior of the housing to provide additional support to the mounting bracket and to permit the mounting bracket to be attached in a stable fashion to only one said mounting posts if desired. The stabilizing means may comprise a pair of downwardly depending leg members attached to opposite ends of the second end portion of the mounting bracket and extending generally transverse to the body portion.

Another aspect of the present invention provides a discrete surveillance device for observing a surveillance location, including a housing having an interior, an exterior formed in the shape of a smoke detector, and two or more camera viewing apertures formed in the exterior of the housing. The surveillance device also includes at least two miniature video surveillance cameras, preferably CCD video cameras, mounted within the interior of the housing which are arranged such that they are directed out of the camera viewing apertures to allow observation of multiple areas of the surveillance location by the surveillance cameras. Concealing means, such as mesh screening positioned over the camera viewing apertures, for concealing the surveillance cameras from an observer viewing the exterior of the housing are also provided. In addition, the concealing means can also comprise one or more tinted, translucent covers positioned over the camera viewing apertures.

Desirably, the surveillance cameras are mounted on a camera gimbal including at least two perpendicular axes of rotation to allow horizontal and vertical swivel positioning and adjustment of the surveillance camera. The camera gimbals also preferably include axis displacement means for allowing positioning of the axes of rotation to provide forward and back and up and down displacement of the surveillance cameras.

Preferably, the housing includes a bottom wall and one or more upstanding side walls, and a first bottom surveillance camera is mounted in the housing to allow observation through the bottom wall and four side wall surveillance cameras are mounted in the housing to allow observation at locations through the side walls. The surveillance device also preferably includes mounting means for mounting the surveillance device in a room for observing the desired surveillance location.

In another aspect of the present invention, a discrete surveillance device for observing a surveillance location is provided with a face plate including an exterior surface, a interior surface and a camera viewing aperture. A miniature video surveillance camera, such as a CCD video camera, is mounted on a camera gimbal which is in turn mounted behind the back surface of the face plate. The camera gimbal includes at least two perpendicular axes of rotation to allow horizontal and vertical swivel positioning and adjustment of the surveillance camera. Concealing means, such as a tinted, translucent cover, is provided for concealing the surveillance camera from an observer viewing the exterior surface of the face plate. The camera gimbal preferably includes axis displacement means for allowing positioning of the axes of rotation to provide forward and back and up and down displacement of the surveillance camera. Mounting means are also provided for mounting the surveillance device in a wall for observation of the desired surveillance location.

In yet another aspect of the present invention, a discrete surveillance device for observing a surveillance location includes a housing having an interior, an exterior provided with the face of a clock, and a camera viewing aperture. The surveillance device further includes a miniature video surveillance camera, such as CCD video camera, mounted within the interior of the housing and on a camera gimbal including at least two perpendicular axes of rotation to allow horizontal and vertical swivel positioning and adjustment of the surveillance camera. Concealing means such as tinted, translucent cover positioned over the camera viewing aperture is provided for concealing the surveillance camera from an observer viewing the exterior surface of the housing.

Desirably, the camera gimbal further comprises axis displacement means for allowing positioning of the axes of rotation to provide forward and back and up and down displacement of the surveillance camera. The surveillance device preferably includes a working clock visible to an observer viewing the exterior of the housing.

The foregoing and other objects, features and various advantages of the present invention will be more readily apparent from the following detailed description of the preferred embodiments set forth below, taken in conjunction with the accompanying drawings.

DETAILED DESCRIPTION OF PREFERRED EMBODIMENTS

Figure 1:
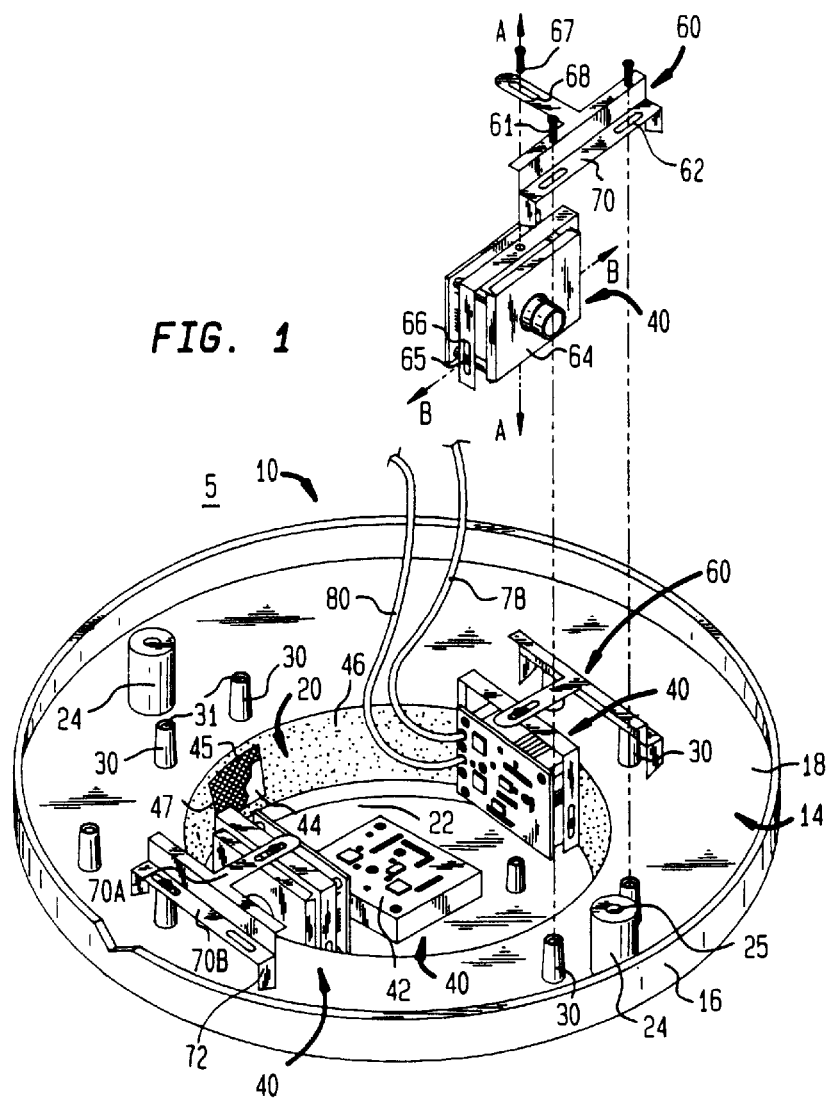
FIG. 1 is a top perspective and partially exploded view of a discrete surveillance device in accordance with one embodiment of the present invention.
Figure 2:
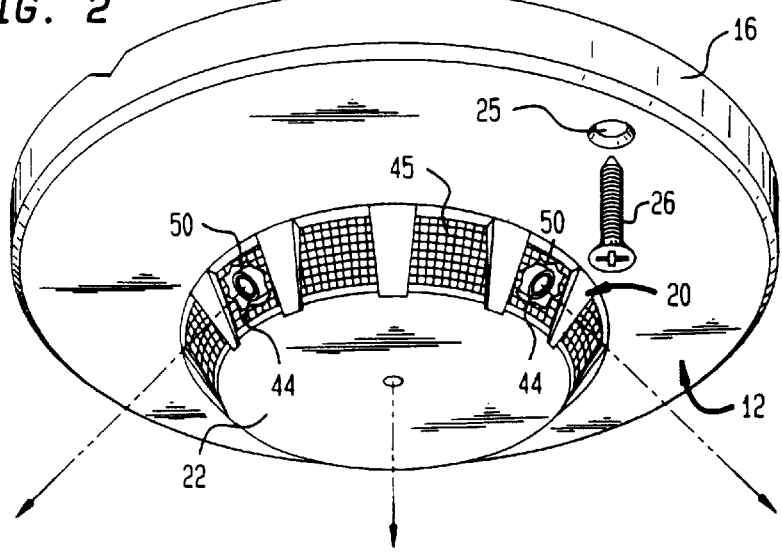
FIG. 2 is a bottom perspective view of the discrete surveillance device shown in FIG. 1 with portions cut away for clarity.

Referring to FIGS. 1 and 2, there is shown a discrete surveillance device, generally designated as 5, in accordance with a preferred embodiment of the present invention. Discrete surveillance device 5 comprises a housing 10 which includes an exterior 12 and an interior 14. Located within interior 14 of housing 10 are side surveillance cameras 40 and lower surveillance camera 42 which are used to monitor multiple views of a surveillance area. Housing 10 is formed in the shape of smoke detector to hide the fact that the device is being used for surveillance purposes.

Housing 10 is preferably circular in shape and includes an upstanding upper side wall 16, an intermediate wall 18 generally transverse to upper side wall 16, an upstanding lower side wall 20, and bottom wall 22 substantially transverse to lower side wall 20. Disposed on intermediate side wall 18 are housing mounting posts 24 which include post channels 25 extending therethrough for screws 26 or other fastening elements to secure housing 10 to a wall or to the ceiling of a room in the conventional manner in which smoke detectors are mounted. Preferably, post channels 25 are integrally formed with housing 10 which can be formed by injection molded plastic.

Located within interior 14 of housing 12 and surrounding lower side wall 20 is mesh screening 45, which alone may serve to conceal the surveillance cameras from the observer. Selection of the proper mesh is important, as mesh that is too thick can interfere with the camera's view, while mesh that is dark in color, such as black, will absorb incoming light such that an observer can see into the interior of the housing through the mesh screening. The mesh, therefore, is preferably light-reflective (such as a silver colored aluminum mesh) such as bright aluminum screening stock number 01136 sold by Hanover Wire Cloth, Division of CCX, Inc., Hanover, Pa.

In addition to the use of mesh screening 45 a cover band 46 can also be used which is preferably black in color to further conceal the interior 14 of the housing 10, especially at locations in which no surveillance camera will be positioned. Cover band 46 includes a number of cut-out portions 47 located at camera viewing apertures 44. Camera viewing apertures 44 are provided at a number of positions around lower side wall 20 to allow the surveillance cameras 42 to observe the surveillance area outside of housing 10. Other ways of concealing the surveillance cameras within the housing 10 are possible, such as by providing tinted covers of glass or plastic at each aperture 50, or a band of tinted glass or plastic surrounding lower side wall 20. Moreover, the plastic covering can consist of an infrared (IR) transmitting red plastic cover.

Intermediate side wall 18 further includes gimbal mounting posts 30 which extend upwardly and include gimbal mounting post channels 31 therein. Again, gimbal mounting posts are preferably integrally formed with housing 10. Preferably, a pair of gimbal mounting posts 30 are provided for each side surveillance camera 40 positioned within interior 14 of housing 10.

In a preferred embodiment, four miniature side surveillance cameras 40 are located within interior 14 and are positioned at equal distances around lower side wall 20 at camera viewing apertures 44. In this manner, multiple views of a surveillance location can be simultaneously observed. In addition, lower surveillance camera 42 is desirably A provided to allow yet a further bottom view of the surveillance area. In another preferred embodiment, a single surveillance camera 40 is provided and mounted on an adjustable camera gimbal as now described below.

Miniature side surveillance cameras 40 are preferably mounted on adjustable camera gimbals, generally designated as 60, each which include a frame member 64 and a mounting bracket 70 having a generally T-shaped body. Mounting bracket 70 includes a first leg portion 70a and a second leg portion 70b which extends generally transverse to first leg portion 70a. The camera gimbals are mounted to gimbal mounting posts 30 by fastening screws 61 which pass through slots 62 in provided in second leg portion 70b of mounting bracket 70, and are screwed into gimbal mounting post channels 31. Slots 62 are provided for side-to-side adjustment of the mounting brackets 70 and hence the camera gimbals 60 within housing 10.

Each frame member 64 holds a respective side surveillance camera 40, and each side surveillance camera is pivotally mounted within a frame member 64 by screws 65 which extend through side slots 66 disposed in frame member 64. Each frame member 64 is pivotally mounted to mounting bracket 70 by screw 67 which extends through top slot 68 provided in first leg 70a. In this manner, as shown in FIG. 1, each side surveillance camera is rotatable and positionally adjustable along perpendicular imaginary axes A—A and B—B, and each such axis is displaceable forward and back and up and down within the tolerance of slots 66 and 68.

Mounting bracket 70 of camera gimbal 60 is designed to achieve maximum flexibility in positioning within interior 14 of housing 10 and can be positioned in almost any desired position around the circumference of intermediate wall 18. That is to say, although each mounting bracket 70 is preferably mounted to two of the mounting posts 30, each mounting bracket can also be mounted to only one mounting post in order to allow the camera to be moved to different positions about interior 14. Thus, mounting bracket 70 includes stabilizing means for stabilizing it to the interior 14 of housing 10. The stabilizing means preferably includes a pair of downwardly extending leg members 72 attached to opposite ends of second leg portion 70b and serve to stabilize the mounting bracket against intermediate wall 18 as shown in FIG. 1.

Miniature surveillance cameras are preferably CCD video cameras such as conventional CCD-600/4 CCD cameras, and include a power cable 78 and a video cable 80 attached thereto for supplying power to the camera and to carry the video images to one or more surveillance monitors and/or video cassette recorders.

Figure 3:
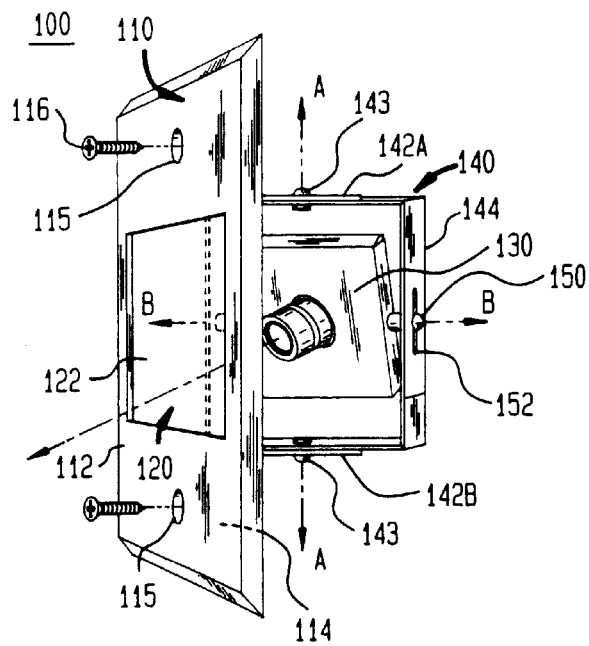
FIG. 3 is a side perspective view of a discrete surveillance device in accordance with another embodiment of the present invention.
Figure 4:
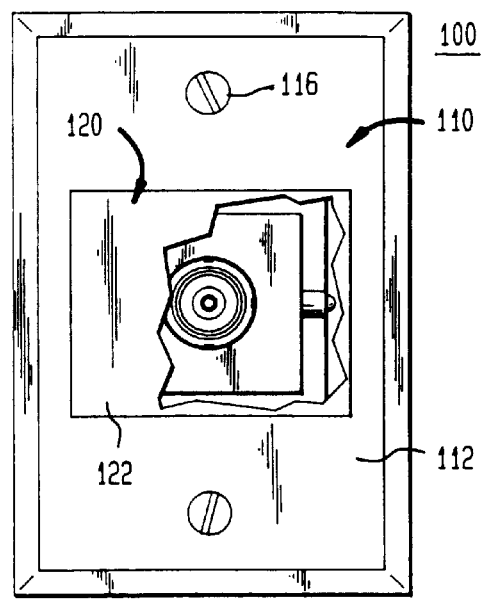
FIG. 4 is front view of the discrete surveillance device shown in FIG. 2 with a portion cut away for clarity.

Turning to FIGS. 3 and 4, another preferred discrete surveillance device in accordance with the present invention is shown, generally designated as 100. Discrete surveillance device 100 includes a face plate 110 having an exterior surface 112 and an interior surface 114. Face plate 110 also includes a camera viewing aperture 120 covered by a tinted, translucent glass window 122 (or an IR transmitting red cover) which is preferably secured to interior surface 114. Mounting holes 115 are provided in face plate 110 to accept mounting screws 116 which secure face plate 110 to the wall in the usual manner in which wall face plates are attached to wall switch boxes or similar anchoring devices.

Disposed behind face plate 110 is surveillance camera 130 which is mounted on camera gimbal 140. Camera gimbal 140 is in turn mounted to interior surface 114 of face place 110, and includes mounting brackets 142a and 142b and frame member 144. Frame member 144 is secured to mounting brackets 142a and 142b by means of screws 143 which extend through slots (not shown) in the mounting brackets 142a and 142b so as to allow forward and back positional adjustment of the frame member 140. Similarly, surveillance camera 130 is pivotally mounted within a frame member 140 by screws 150 which extend through side slots 152 disposed in frame member 140. Thus, the surveillance camera 130 is rotatable and positionally adjustable along perpendicular imaginary axes A—A and B—B, and each such axis is displaceable forward and back or up and down within their respective slots for maximum adjustability of the surveillance camera.

Surveillance device 100 is a discrete surveillance device. That is, face plate 110 is formed to have the look of a traditional switch or wall face plate and is provided with a tinted cover of glass or plastic so that a casual observer cannot see the surveillance camera behind the face plate, and will be led to believe that behind the face plate is an occupancy sensor or similar device rather than a surveillance camera.

Figure 5:
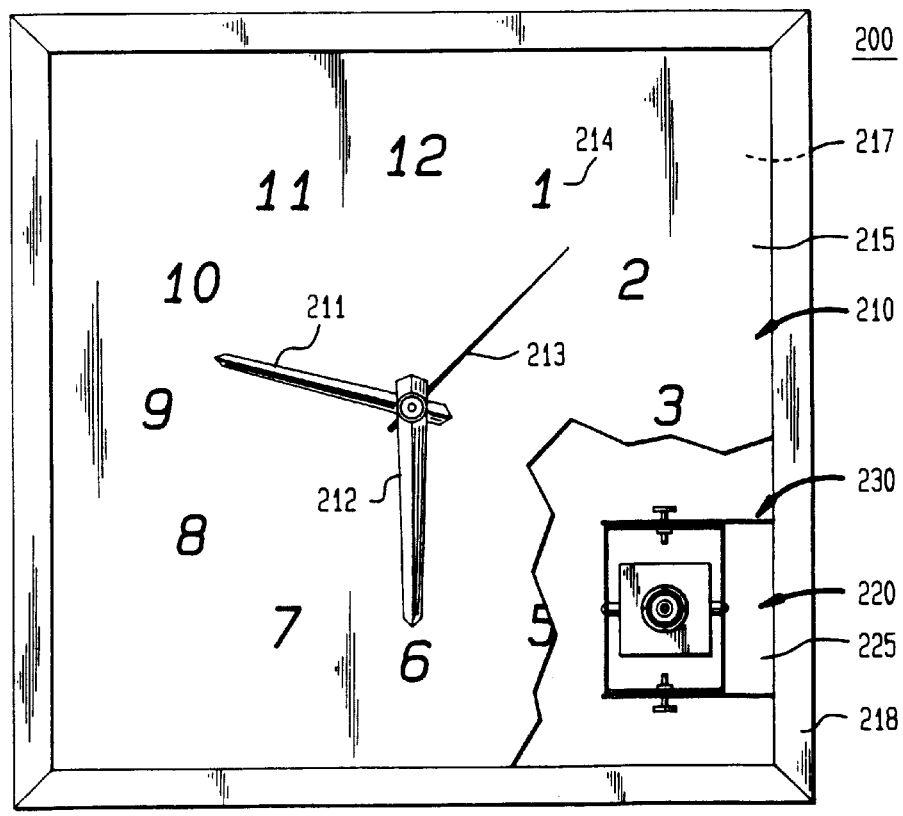
FIG. 5 is a front view of a discrete surveillance device in accordance with yet another embodiment of the present invention with a portion cut away for clarity.

Referring now to FIG. 5, yet another preferred discrete surveillance device in accordance with the present invention is shown, generally designated as 200. Discrete surveillance device 200 in this aspect includes a housing 210 having an exterior 215, an interior 217 and a frame 220. Exterior 215 includes a clock, having an hour hand 211, minute hand 212, second hand 213 and dial numerals 214. The discrete surveillance device 200 is therefore intended to look like a desktop or wall clock to the casual observer. Preferably, the clock is operable and the clock mechanism (battery, gears, etc.) is located behind exterior 215. Exterior 215 is preferably formed from a tinted translucent glass or plastic in order to conceal the surveillance camera 220 located within housing 210. Again, surveillance camera 220 is mounted on an adjustable camera gimbal 230 with two perpendicular axes of rotation and which is adjustable to allow forward and back and up and down displacement of the rotation axes. Housing 200 includes a camera viewing aperture 225 which can be the full size of the exterior frame 218 or can comprise a smaller aperture disposed at the location of the surveillance camera 220.

Although the invention herein has been described with reference to particular preferred embodiments, it is to be understood that such embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Moreover, it will be understood that it is intended that the present invention cover various combinations of the features described herein in addition to those specifically set forth in the appended claims.

What is claimed is:

1. A discrete surveillance device adapted to be mounted in a fixed location on a ceiling for observing a surveillance location, comprising:

a housing including an interior, an exterior formed in the shape of a smoke detector, a bottom wall lying in a first plane substantially parallel to the surface of the ceiling to which said surveillance device is mounted, a circumferential side wall extending substantially transverse to said bottom wall, a bottom camera viewing aperture disposed in said bottom wall, and one or more side camera viewing apertures formed in said side wall and;

at least two stationary miniature video surveillance cameras mounted within said interior of said housing so as to be concealed from an ordinary observer viewing said exterior of said housing and said surveillance cameras being arranged such that they are directed out of said bottom and side camera viewing apertures to allow simultaneous observation of substantially non-overlapping areas of the surveillance location including a bottom viewing area directly below said surveillance device and at least one viewing area adjacent said bottom viewing area.

2. The discrete surveillance as claimed in claim 1, wherein at least two stationary miniature video surveillance cameras are arranged to be directed out of said side camera viewing apertures to allow simultaneous observation of at least two substantially non-overlapping areas surrounding said bottom viewing area.

3. The discrete surveillance device as claimed in claim 1, wherein said surveillance cameras directed out of said side camera viewing apertures are concealed by mesh screening positioned over said camera viewing apertures.

4. The discrete surveillance device as claimed in claim 1, wherein said surveillance cameras directed out of said side camera viewing apertures are concealed by one or more tinted, translucent covers positioned over said camera viewing apertures.

5. The discrete surveillance device as claimed in claim 1, wherein said surveillance cameras comprise CCD video cameras.

\* \* \* \* \*